Aug. 12, 1924.  1,504,243

W. J. HOSCEIT

DUMP CAR CONSTRUCTION

Filed Aug. 15, 1921    2 Sheets-Sheet 1

Witness:
R. Burkhardt

Inventor
William J. Hosceit,
By Wilkinson Huxley Byron & Knight
attys

Aug. 12, 1924.  
W. J. HOSCEIT  
DUMP CAR CONSTRUCTION  
Filed Aug. 15, 1921  
1,504,243  
2 Sheets-Sheet 2

Witness:  
R. Burkhardt

Inventor:  
William J Hosceit,  
By Wilkenson Huxley Byron & Knight  
attys.

Patented Aug. 12, 1924.

1,504,243

UNITED STATES PATENT OFFICE.

WILLIAM J. HOSCEIT, OF CHICAGO, ILLINOIS, ASSIGNOR TO RODGER BALLAST CAR COMPANY, OF CHICAGO, ILLINOIS, A CORPORATION OF MAINE.

DUMP-CAR CONSTRUCTION.

Application filed August 15, 1921. Serial No. 492,249.

*To all whom it may concern:*

Be it known that I, WILLIAM J. HOSCEIT, a citizen of the United States, residing at Chicago, in the county of Cook and State of Illinois, have invented certain new and useful Improvements in Dump-Car Constructions, of which the following is a specification.

This invention relates to a new and improved dump car construction, and more particularly to an improved door and door operating means, and means associated with the door for properly directing the discharge of material.

In dump cars used for handling ballast or similar material it is often desirable to be able to dump material either between the rails or laterally to either side of the rails.

It is an object of the present invention to provide car construction and associated doors adapted to selectively dump the material either inwardly of the rails or laterally to either side.

It is a further object to provide door operating mechanism for use in connection with such doors, which is simple in design and effective in its operation.

Other and further objects will appear as the description proceeds.

The form of my invention selected for purposes of illustration, comprises the provision in a dump car of lateral floor portions sloping toward the center of the car and central floor portions sloping toward the side of the car. Floor openings are provided between these floor portions and are covered by doors. These doors are so constructed as to operate to uncover the openings and direct the material selectively either inwardly or outwardly of the rails. The central sloping floor portion is adapted to aid in directing the material through the opening when discharging to the side and to limit the opening to prevent too sudden discharge when dumping between the rails.

A door operating shaft is provided preferably located below the center sills and between the central floor portions. This shaft is connected by means of links to both door constructions in such manner as to simultaneously open and close both doors for dumping between the rails. Additional door operating means are provided to selectively open either or both doors for dumping to either or both sides of the rails.

I have illustrated a preferred embodiment of my invention in the accompanying drawings, in which—

Figure 1:
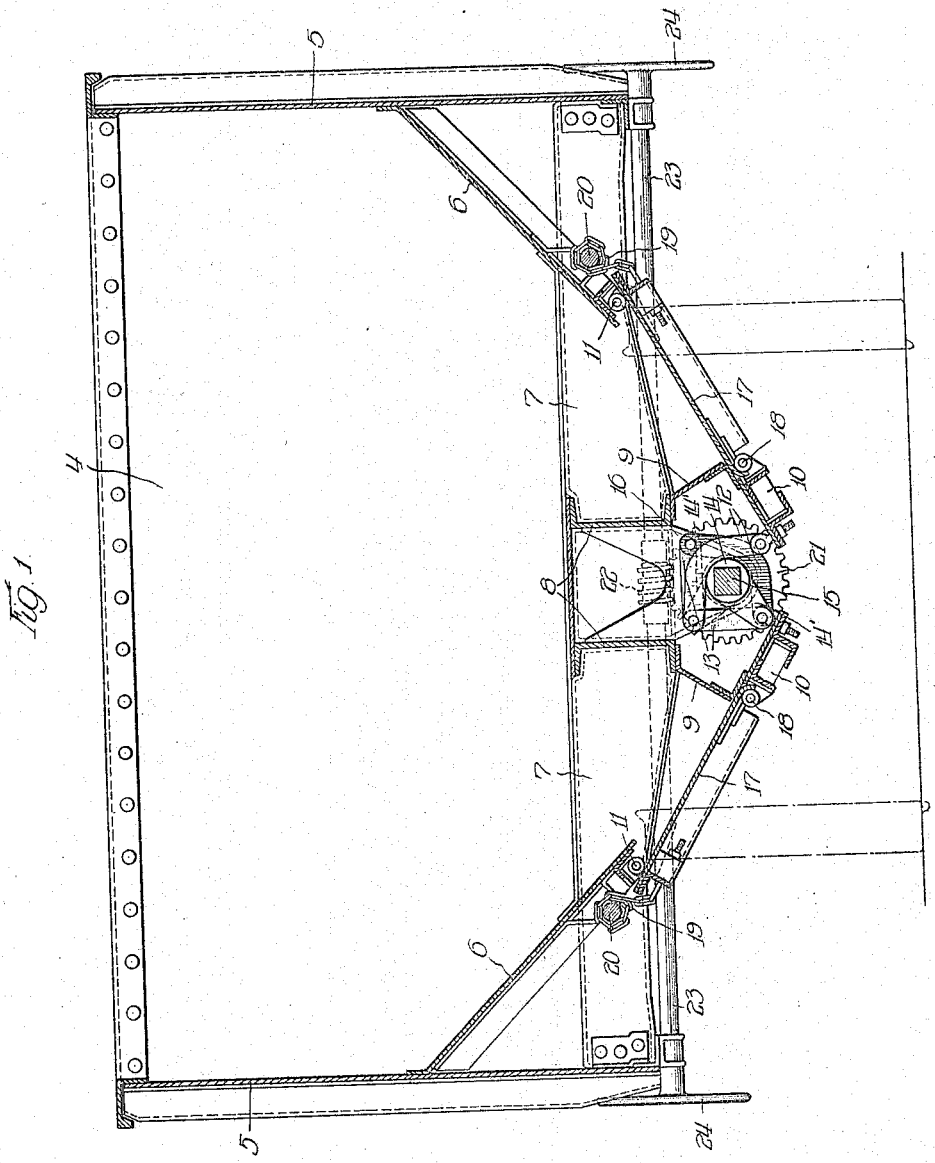
Figure 1 is a transverse section of a car showing my invention applied thereto, the doors being shown closed.

Referring to the drawings, Figure 1 shows a car comprising the end 4, sides 5, inwardly sloping side floor portions 6, bolster 7, and center sills 8. Downwardly and outwardly directed from the center sills are the central floor portions 9. The door frame members 10 are pivotally connected at 11 to the car at a point below the inner end of the sloping floor member 6. These door members slope downwardly and inwardly and their inner ends are connected by links 12 and 13 to arms 14′ which extend from a collar 14, the latter being secured to the center shaft 15. This shaft 15 extends longitudinally of the car and is supported in brackets 16 below the center sills and between the floor members 9.

The inner door members 17 are pivoted in the door frame members 10 at 18, this point 18 being such as to be adjacent the lower end of the floor portions 9 when the door assembly is closed. The outer ends of the inner door members 17 are secured by chains 19 to the shafts 20.

As best shown in Figure 1, the shaft 15 carries the gear wheel 21 which is in mesh with the worm gear 22 upon the transverse shaft 23. This shaft 23 is provided at either end with the operating hand wheel 24. Any suitable means (not shown) may be provided for effectively rotating the side shafts 20.

Figure 2:
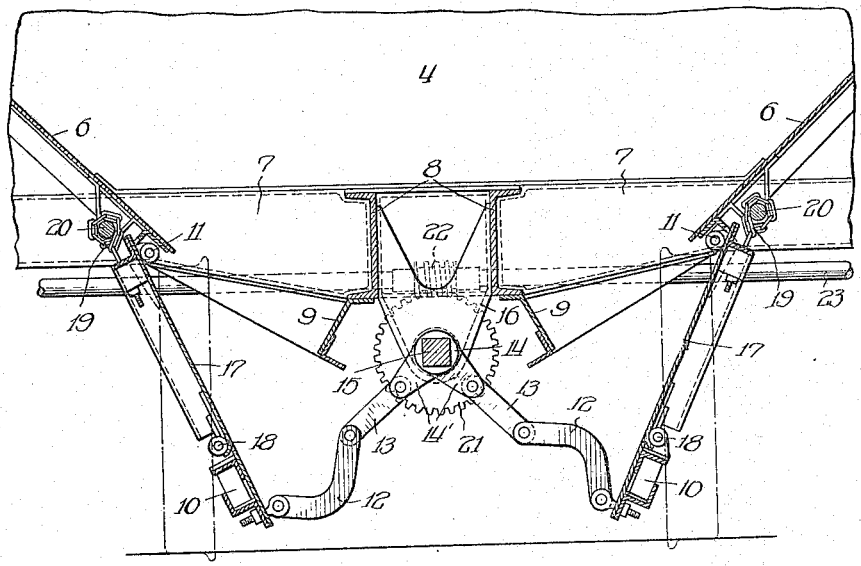
Figure 2 is a view similar to Figure 1, the doors being shown open for dumping inwardly, and, Figure 3 is a view similar to Figure 2, one door being shown open for dumping outwardly of the rails.

As best seen from consideration of Figures 1 and 2, rotation of the shaft 15 in the clockwise direction serves to so move the links 13 and 12 as to release the outer door frame member 10 upon either side of the car. These door frame members carry with them the inner door members 17. The inner portion of the door frame members 10 serves to guide the material in dumping and to prevent it from falling upon the rails. The floor portions 9 serve to limit the opening and prevent too sudden a discharge of material.

As will be clearly apparent from the figures, the arms 14' connect with opposite doors, and are placed upon lines approximately 90 degrees apart. This angle depends upon the relation of the shaft to the doors and would vary in different door constructions.

Rotation of the shaft 15 in one direction serves to simultaneously open or close both doors. The links 12 are angular in form in order to partially encircle the shaft 15 when the doors are in closed position, as shown in Figure 1.

In this position the links bear upon the collar 14 and the load on the doors is thus transmitted to this collar and to the shaft 15 and is not carried by the arms 14'. The links are of sufficient length so that the line of pull is directed through the axis of the shaft rather than as a tangential pull tending to rotate the shaft. When the doors are closed the pull due to downward strains on the door, is in a straight line through the pivot connection of the link to the door, the axis of the shaft and the connection of the link to the shaft.

Figure 3:
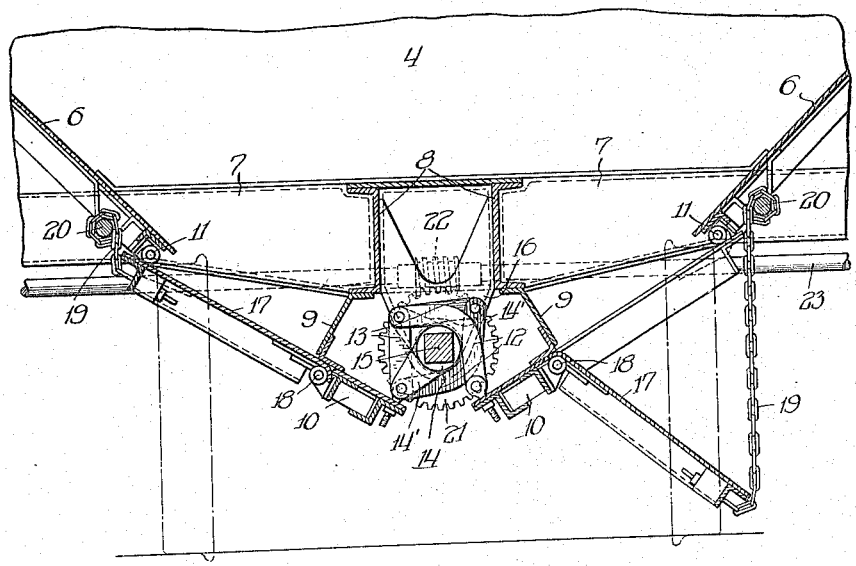

As shown in Figure 3, rotation of the shaft 20 in counter clockwise direction serves to release the inner door member 17. This member is of sufficient length so that material is guided beyond the rails. The floor member 9 serves to guide the material toward the door 17.

My door construction is composed of but few and rugged parts and is simple in design and effective in operation. While the device has been shown as applied to doors of one particular type of car, it is obviously not limited in its application to cars of that design, but may be applied to swinging doors of any type.

I claim:

1. In a dump car, center sills, a floor having openings either side of said center sills, doors covering the floor openings, the doors consisting of frame members pivoted at one side of said openings and inner members pivoted in the frame members adjacent the opposite side of the floor openings, a longitudinal shaft adjacent the center sills, arms on said shaft and links connecting the arms to similar door members on either side of said center sills, shafts adjacent the outer edges of the doors, and means connecting said shafts to the remaining door members, the links coacting with the center shaft and the means coacting with the outer shafts in such manner as to release or to draw up the door members to which they are connected, when the shafts are rotated.

2. In a dump car, center sills, sides, lateral floor portions sloping downwardly from the sides toward the center sills, central floor portions sloping outwardly and downwardly from the center sills, floor openings between said central and lateral floor portions, inwardly sloping doors covering the floor openings, the doors consisting of frame members pivoted at one side of said openings and inner members pivoted at the opposite side of said openings, a longitudinally extending shaft located between the center floor portions and below the center sills, arms on said shaft and links connecting the arms to similar door members on either side of said center sills, shafts adjacent the outer edges of the doors, and means connecting said shafts to the remaining door members, the links coacting with the center shaft and the flexible means coacting with the outer shafts in such manner as to release or to draw up the door members to which they are connected, when the shafts are rotated.

3. In a dump car, center sills, sides, lateral floor portions sloping downwardly from the sides toward the center sills, central floor portions sloping outwardly and downwardly adjacent the center sills, floor openings between said central and lateral floor portions, doors covering the floor openings, the doors consisting of frame members pivoted at the outer side of the said openings and inner members pivoted in the frame members adjacent the inner side of the floor openings, a longitudinal shaft adjacent the center sills, arms on said shaft and links connecting the shaft to the inner ends of the frame members, shafts adjacent the other edges of the floor openings and flexible means connecting said shafts to the outer edges of the inner door members, said links and flexible means coacting with their respective shafts and door members to release or to draw up the door members to which they are connected when the shaft is rotated.

Signed at Chicago, Illinois, this 9th day of August, 1921.

WILLIAM J. HOSCEIT.